July 24, 1928.  P. F. SHIVERS  1,678,202
ELECTRIC VALVE
Filed May 24, 1926   2 Sheets-Sheet 1

INVENTOR.
Paul F. Shivers,
BY
Hood & Hahn.
ATTORNEYS

July 24, 1928.

P. F. SHIVERS

ELECTRIC VALVE

Filed May 24, 1926

INVENTOR.
Paul F. Shivers,
BY
Hood & Hahn.
ATTORNEYS

Patented July 24, 1928.

1,678,202

UNITED STATES PATENT OFFICE.

PAUL F. SHIVERS, OF WABASH, INDIANA, ASSIGNOR, BY MESNE ASSIGNMENTS, TO MINNEAPOLIS-HONEYWELL REGULATOR COMPANY, OF MINNEAPOLIS, MINNESOTA, A CORPORATION OF DELAWARE.

ELECTRIC VALVE.

Application filed May 24, 1926. Serial No. 111,154.

My invention relates to improvements in electro-magnetically operated valves and has for its object the provision of means for electro-magnetically operating the valve, which will open the valve on a minimum consumption of power and will positively close the valve after the power has been shut off.

Heretofore, commercially it has been the custom, in operating valves electro-magnetically, to provide a solenoid having a reciprocating core attached to the valve stem, which solenoid when energized will raise the valve from its seat and open the same maintaining the valve open so long as current passes through the solenoid. One of the objections to this type of operating mechanism is that gravity alone is depended upon for closing the valve after current has been cut off from the solenoid and as a result sufficient power is not developed to firmly seat the valve. If the normal weight of the valve is supplemented by increasing the weight thereof sufficiently to properly seat the valve or by providing a spring for forcing the valve downwardly, then, in order to overcome this resistance against raising, the solenoid must be made so large as to be commercially impractical.

Rotary electric motors have been used for opening and closing valves but one of the objections to this manner of operation is that in order to maintain the valve open the current is shut off to the motor and must be again closed to the motor for closing purposes. In other words the motor does not remain energized and maintain the valve open.

My invention provides a structure whereby a rotary motor may be used for opening the valve, thereby providing sufficient power to move the valve against a strong bias towards closing position, this bias being effected by either a spring or increasing the weight of the valve or its associated parts.

For the purpose of disclosing my invention I have illustrated one embodiment thereof in the accompanying drawings in which Fig. 1 is a perspective view of a valve embodying my invention;

Figure 1:
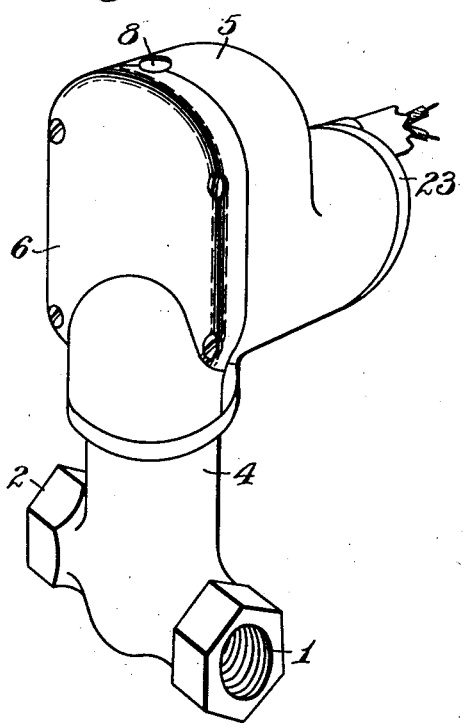
Figure 2:
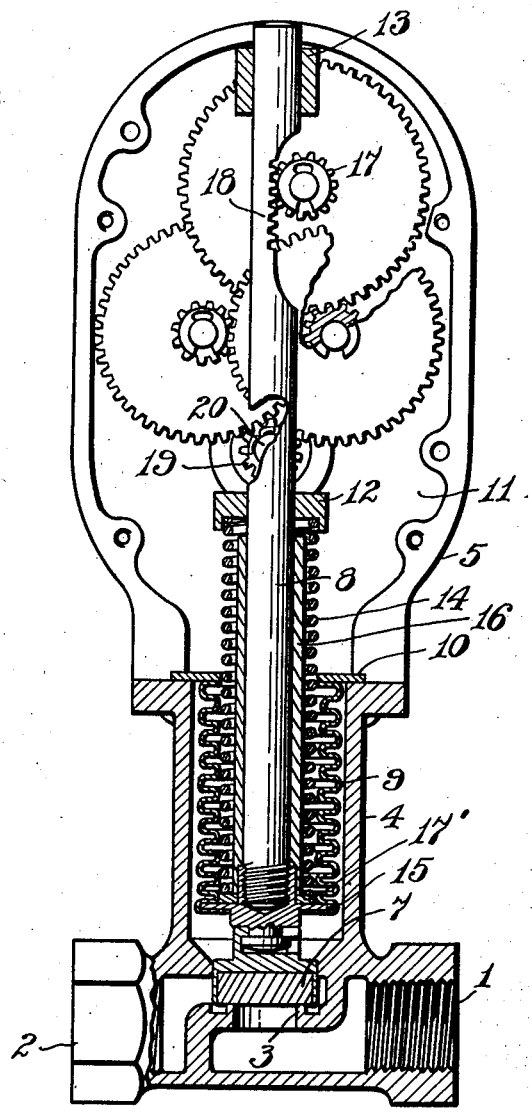
Fig. 2 is a front elevation partly in section and with the cover plate of the casing removed.
Figure 3:
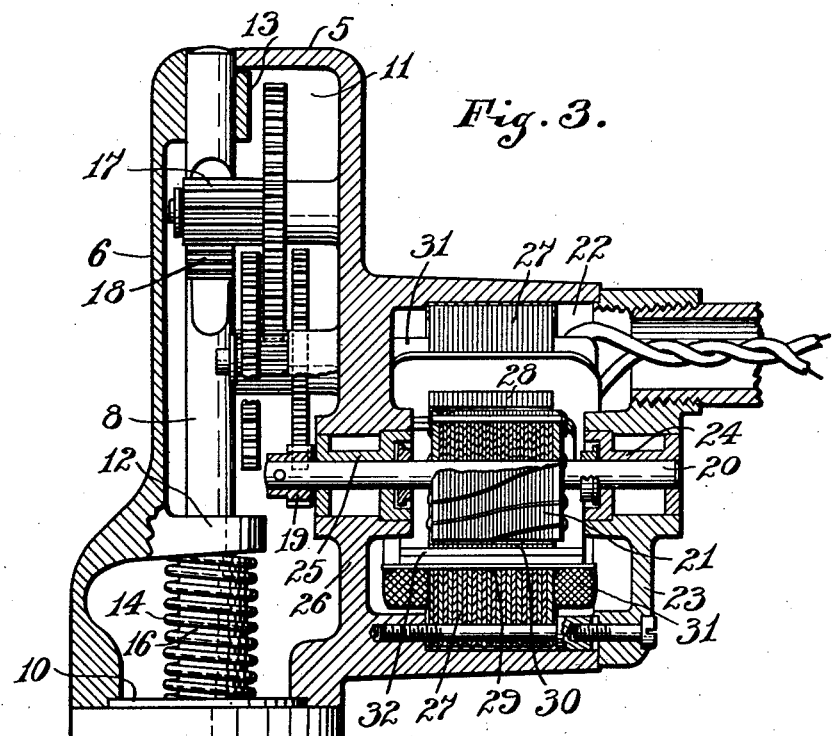
Fig. 3 is a longitudinal sectional view.
Figure 4:
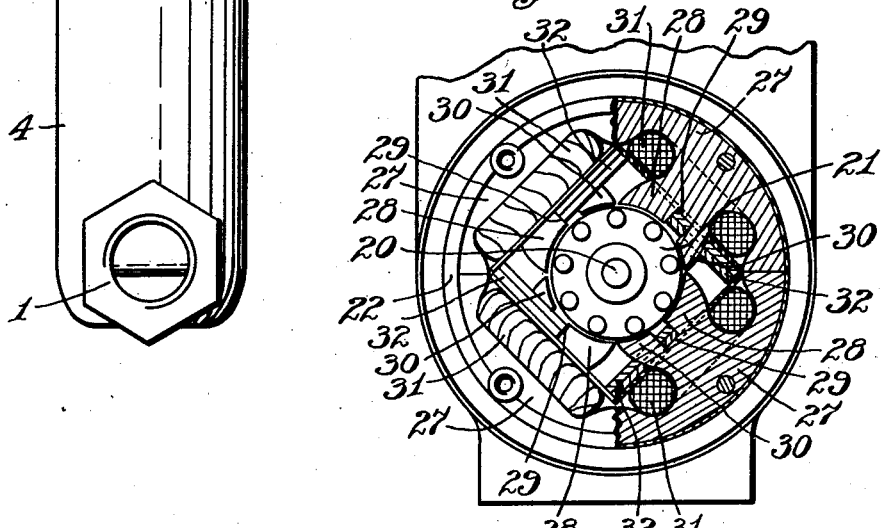
Fig. 4 is a front elevation partly in section of the motor for operating the valve.

In the embodiment illustrated I provide a T valve casing having inlet and outlet connections 1 and 2 and provided with an annular seat 3. The stem 4 of the casing is secured to the lower end of the power unit casing 5 provided with a removable cover 6. The valve 7 seating on the seat 3 is attached to a stem 8 and the lower end of this stem is connected to the end of a bellows 9 the upper end of which is connected to an annular flange 10 seated between the top of the stem 4 and the bottom of the casing 5 so that the gear train chamber or recess 11 is effectually sealed against the valve chamber. This bellows may be of any suitable construction although I prefer to use that type commonly known in the art as "sylphon". The valve stem 8 is extended in length to pass through a guiding and stop ear 12 formed integrally on the face of one of the walls of the casing and also extends through a guiding ear 13 at the top of the casing, and the valve is normally held in seated position by a coiled spring 14 interposed between the ear 12 and the flange 15 at the bottom of the stem and to which the "sylphon" bellows is attached. This spring, it will be noted, is contained within the bellows, and for limiting the upward movement of the stem, the stem is surrounded by a sleeve 16 bearing at its lower end on a washer 17′ interposed between the flange 15 and the bottom of the sleeve. The upper end of this sleeve is adapted to strike, when the valve is raised, the ear 12 and thus limit the upward movement of the valve.

A driving and power multiplying gear train is located within the train casing 11 and includes a pinion 17 adapted to mesh with a rack 18 on the stem 8 and a pinion 19 mounted on the shaft 20 of the rotor 21 of an alternating current motor of the induction type. This motor is mounted within a separate chamber 22 in the casing, which chamber is provided with a removable cover 23 having a bearing 24 for one end of the shaft. The bearing 25 for the opposite end of the shaft is mounted in the wall 26 of the casing. The stator of the motor is preferably of the construction illustrated in my co-pending application Serial No. 21,774 filed April 9, 1925, comprising a series of laminations each lamination being formed of four T shaped sections 27 the stems 28 of the sections comprising the poles of the field magnet and being notched at its lower end 29 to provide a shading pole 30. Each pole is surrounded by a suitable winding 31 and each shading pole has wound thereon suitable shading windings 32. The construction of the motor is such that its windings will not abnormally heat if the motor has been stalled no matter how long current is admitted thereto.

In operation as soon as current is admitted to the motor its rotor will revolve and, through the driving train and rack, raise the stem 8 of the valve and with it the sleeve 16 striking the ear 12 will stall the motor and as long as current passes through the motor the valve will remain in raised position. As soon, however, as current is shut off from the motor the coiled spring 14 will operate to move the valve in a reverse direction seating the valve. This spring is sufficiently strong to overcome the inertia of the gears of the train and of the rotor and drive the valve down with considerable force thereby insuring a complete seating of the valve.

I claim as my invention:

1. The combination with a valve casing and a reciprocating valve therein, means biasing said valve to closed position, of a rotary electric motor supported by the valve casing and arranged when energized to move said valve to and maintain it in open position against the biasing means, a power multiplying gear train supported by the valve body and connecting the rotor of said motor with said valve, and operable in one direction by said biasing means and means for stalling said motor while energized with the valve in open position, whereby said motor will maintain the valve opened, said biasing means being sufficient to overcome the inertia of the motor and gearing train and move the valve to closed position when the motor is de-energized.

2. The combination with a valve having a valve stem provided with a rack, a coiled spring surrounding said stem and interposed between a stop and the valve and urging said valve to closed position, a rotary electric motor arranged when energized to move said valve to and maintain it in open position, a power multiplying gear train interposed between the rotor of said motor and the valve stem and including a pinion meshing with the rack on said stem, and a stop for limiting the opening movement of the valve and stalling said motor while energized whereby the motor will maintain the valve in open position, said spring being sufficiently strong to overcome the inertia of the gear train and rotor of the motor and move the valve to closed position when the motor is de-energized.

3. The combination with a valve casing and a reciprocating valve therein, means biasing said valve to closed position, of a rotary electric motor of the induction type supported by the valve casing and arranged when energized to move said valve to and maintain it in open position against the biasing means, a power multiplying gear train supported by the valve body and connecting said valve with the rotor of said motor and operable in one direction by said biasing means, and means for stalling said motor while energized with the valve in open position, said biasing means being sufficiently great to overcome the inertia of the gear train and rotor of the motor and move the valve to closed position when the motor is de-energized.

4. The combination of a main valve body through which extends a fluid passage having an intermediate valve seat, a reciprocable valve movable to and from said seat, a reciprocable stem for actuating said valve, a bellows surrounding said stem and associated at one end with the stem and associated at the other end with the valve body, a spring within the bellows and acting on the stem to bias the valve to closed position, a rotary electric motor supported on the valve body, a reducing gear train supported on the valve body and connecting the motor rotor with the valve stem.

5. The combination of a main valve body having a valve chamber, a reciprocating valve therein, a valve stem within said body, a bellows within said body with one end secured to the stem, a gear casing secured to said body and clamping the bellows to said body, a reducing gear train connected to said stem and enclosed in said gear casing, a rotary electric motor, of a type permitting stalling of its rotor, supported on said valve body with its rotor connected to the high speed end of the gear train, and a spring arranged within the bellows and engaging the valve stem to bias the valve to closed position.

In witness whereof I, PAUL F. SHIVERS, have hereunto set my hand at Wabash, Indiana, this 19th day of May, A. D. one thousand nine hundred and twenty-six.

PAUL F. SHIVERS.